(No Model.) 2 Sheets—Sheet 1.

C. MARTIN.
MATCH MAKING MACHINE.

No. 356,485. Patented Jan. 25, 1887.

Witnesses:
C. W. H. Brown,
M. L. Williams,

Inventor:
Charles Martin,
By W. H. Bartlett
Attorney (No Model.) 2 Sheets—Sheet 2.
C. MARTIN.
MATCH MAKING MACHINE.
No. 356,485. Patented Jan. 25, 1887.
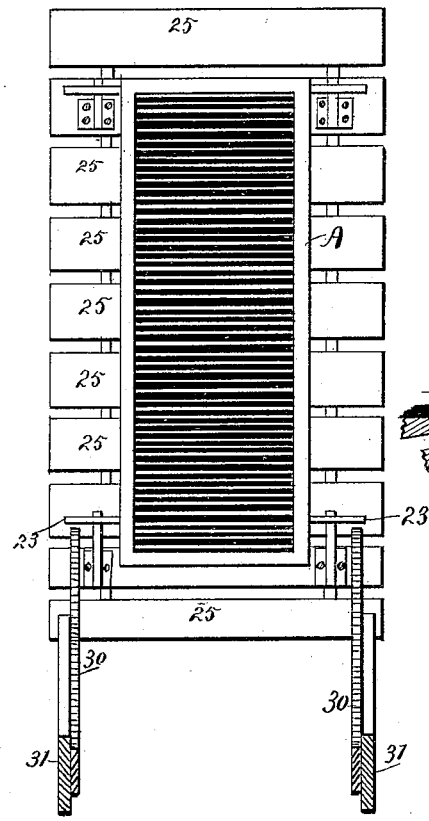
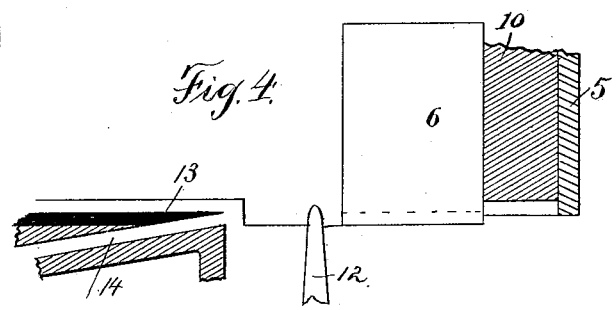
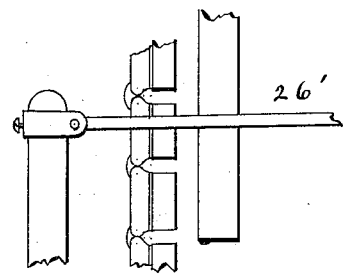
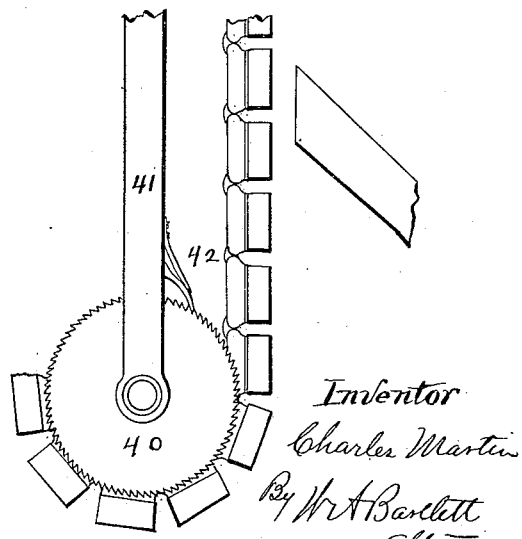
Witnesses:
C. W. H. Brown,
M. L. Williams.
Inventor
Charles Martin
By W. H. Bartlett
Attorney.

UNITED STATES PATENT OFFICE.

CHARLES MARTIN, OF TORONTO, ONTARIO, CANADA.

MATCH-MAKING MACHINE.

SPECIFICATION forming part of Letters Patent No. 356,485, dated January 25, 1887.

Application filed May 5, 1886. Serial No. 201,175. (No model.)

*To all whom it may concern:*

Be it known that I, CHARLES MARTIN, residing at Toronto, in the Province of Ontario, Canada, have invented certain new and useful Improvements in Match-Machines, of which the following is a specification, reference being had therein to the accompanying drawings.

This invention relates to match-making machines in which the matches are cut from a block, carried by the machine to a tray or rack, and inserted in the tray in position for dipping, and the trays automatically conveyed from the machine.

The invention consists in improved constructions and combinations of parts by which the match-splints are conveyed from the knives or cutting-blades to the match-tray; also, in the mechanism by which the matches are inserted in the tray; also, in the tray-carrier and the means for releasing the trays from the carrier and conveying them to or toward the dipping apparatus.

Figure 1:
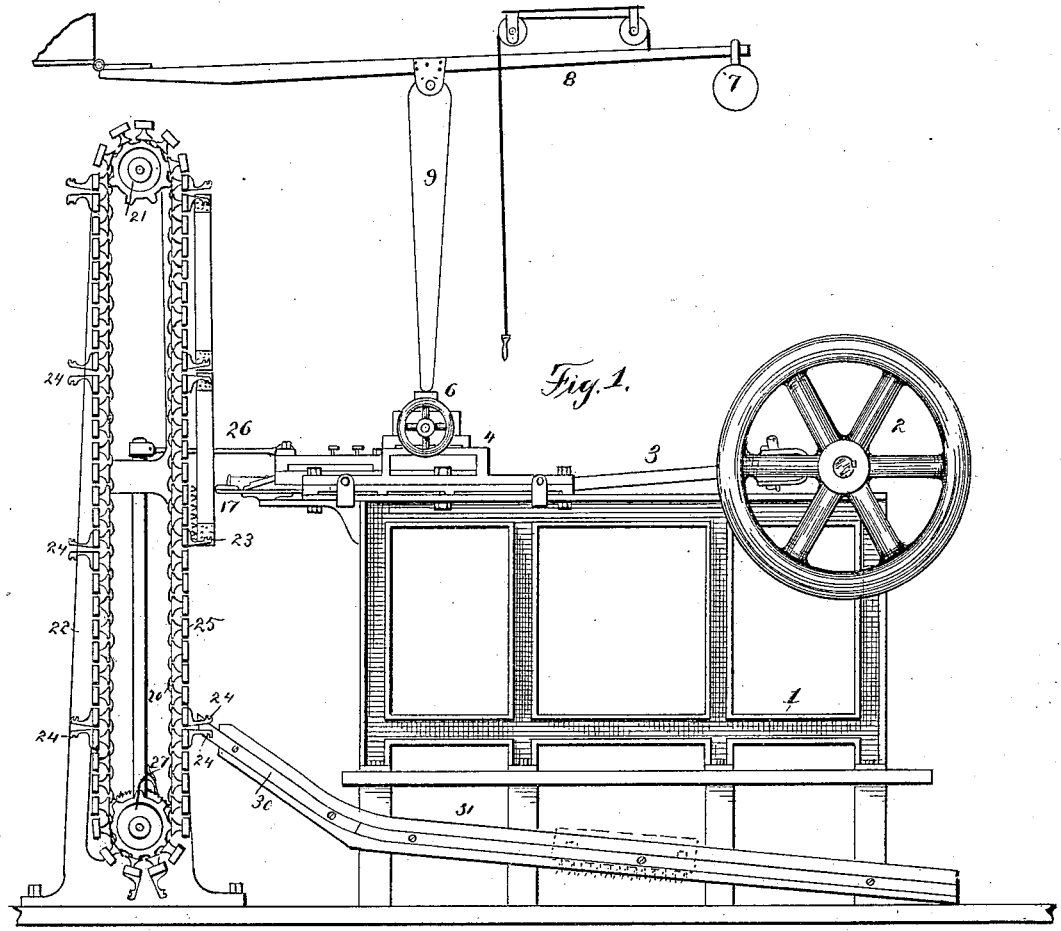
Figure 2:
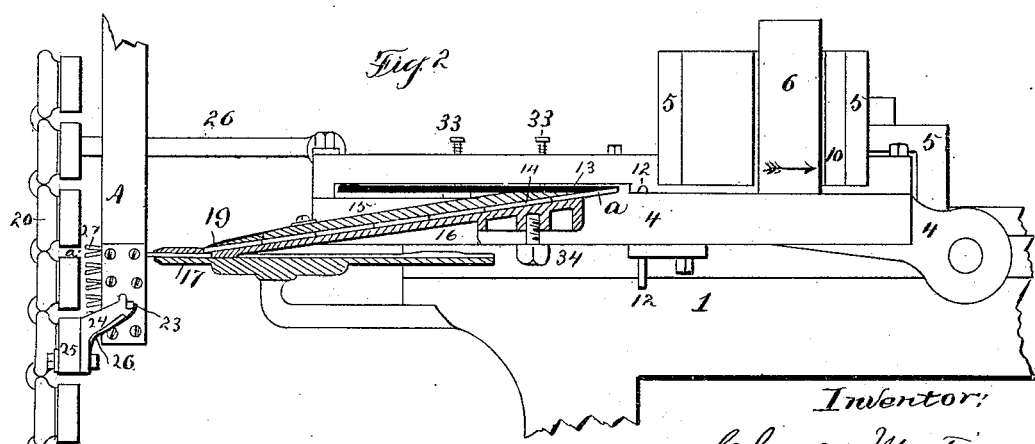

Figure 1 is a side elevation, partly in section, of a machine for cutting the splints and conveying them to the trays, and of the tray-carrier. Fig. 2 is a section and partial elevation, on a larger scale, of the match-cutting devices and the passage-way from the knives to the trough. Fig. 3 is a detail showing the match-tray, supporting-chain, and chute for conveying trays from the machine. Fig. 4 is a longitudinal sectional diagram of part of the machine, showing relative positions of knives and guideway. Fig. 5 is a side elevation, partly broken away, showing a mechanism for moving the endless chain.

The numeral 1 indicates the frame of the machine for cutting the splints from the block. 2 is the drive-wheel, which is rotated by any suitable power, and is connected by pitman 3 with the sliding carriage 4, which carries the cutting and scoring knives. The carriage 4 reciprocates under the block-trough 5, which contains the block 6, which is pressed down in trough 5 by weight 7 on lever 8 bearing on standard 9, which standard rests on the block 6. The block 6 is as wide as the groove 14 between the cutter-blade 13 and the space under the same. In the direction of the arrow, which runs with the grain of the wood, the block is the length of a match-splint. The block is firmly held in trough 6, and a rest, 10, behind the block prevents the detached splints from moving in the direction of the arrow beyond the trough.

Scoring-knives 12 in the moving carriage in front of the blade 13 serve to slit the bottoms of the block 6 to a distance at least equal to the thickness of a match, so that when blade 13 cuts a thin piece from the bottom of block 6, (the same being the thickness of a match,) the matches will be already divided. This cutting off of a series of matches will occur when the carriage moves in the direction of the arrow, Fig. 2.

As the match-splints $a$ are cut from the bottom of block 6 they drop into a channel, 14, which is as wide as a row of match-splints and as deep as the thickness of a splint. Each succeeding cut produces a new row of splints $a$, which row just fills the channel 14, which is between the inclined guides 15 and 16. A number of reciprocations of the carriage 4 will cut enough splints from the block 6 to fill the passage 14, when each succeeding movement of the carriage to the right will cut off another row of matches, and a row already in channel 14 will be dropped upon the table 17. A movement of the carriage 4 in reverse direction after this takes place will bring the end 19 of the plate 16 into contact with the end of the row of matches on table 17, and thus thrust the matches in this row in the direction of their length, (to the left in Figs. 1 and 2.)

A match tray or rack, A, which may be of the general character of that described in my application No. 201,323, filed May 6, 1886, is carried by an endless chain, 20, which chain passes around sprocket-wheels 21, suitably supported, as by standards 22. The row of matches is thrust between the slats or through apertures in this tray A, and the projecting ends $a'$ are then spaced into position for dipping. The tray A has projecting lugs 23 at each end, which lugs rest on brackets 24, projecting from the lugs 25 of the endless chain, and are held on said brackets by springs 26. The endless chain 20 is moved a distance equal to the space between two of the grooves in the match-tray A at each reciprocation of the carriage 4 by means of the connecting-rod 26, which moves a ratchet-wheel or similar actuating mechanism with each reciprocation of the carriage 4, so that after one row of matches is forced into the trays, the ends projecting as at 27, the tray will move down far enough to receive the next row of matches.

In Fig. 5, 26' indicates the connecting-rod, 40 a ratchet-wheel, and 41 a pawl-lever pivoted concentric with said wheel and operated by the connecting-rod. The lever 41 bears the spring or gravity pawl 42 for actuating the ratchet-wheel in a manner well known to mechanics.

As the tray moves down, the front or lower pair of lugs, 23, will come into engagement with the inclined track 30, which will cause the lower end of the tray to ride upon said track 30, and as the other lugs come down they also will be released from the brackets 24, and the trays will then pass onto the track 30 and may be guided along said track in chute 31 in any desired direction.

The thickness of the match splint may be varied slightly by the adjustment of set-screws 33, which control the position of the blade 13. The channel 14 can be regulated in depth by means of set-screw 34.

The mechanism for cutting the matches from the block is but slightly modified in this invention from what is well known in the art. The mechanism for conveying the splints to the match tray or rack and for removing the filled trays from the endless carrier is believed to be new.

The lever 8, to which standard 9 is pivoted, can be lifted by cord and pulley, as shown in Fig. 1.

I claim—

1. In combination with the reciprocating carriage carrying the scoring and slitting knives of a match-splint machine, an inclosed guideway, of greater length than the match-splints, leading from said knives and forming part of said carriage, as set forth.

2. In a match-machine, the reciprocating carriage having cutting and scoring blades, as described, and a continuous guideway behind the cutting-edge of said blades, combined with a table beneath said guideway having a channel which forms a practical continuation of said guideway, whereby a row of splints is received in the guideway and conducted backward into the channel in the table.

3. The combination, with the reciprocating carriage having a cutting-blade and a guideway at the rear of the edge of said blade, of a table beneath said guideway having a channel which forms a continuation of the guideway, and a pusher on the rear of the carriage positioned to operate as a pusher in the channel on the backward movement of the carriage.

4. The combination, with the reciprocating carriage, of an endless-chain carrier provided with tray-supporting brackets and a series of match-trays constructed to rest on said brackets, as set forth.

5. The endless-chain carrier and its series of match-trays, combined with a chute having projecting arms which engage the trays in their passage and remove the trays from the chain, as set forth.

6. The endless chain having brackets thereon, the match-tray having lugs which rest on said brackets, and the inclined chute having arms in the line of movement of said lugs, substantially as described.

In testimony whereof I affix my signature in presence of two witnesses.

CHARLES MARTIN.

Witnesses:
L. V. MARTIN,
E. S. LEADLEY.